United States Patent
Son et al.

(10) Patent No.: US 12,358,069 B2
(45) Date of Patent: Jul. 15, 2025

(54) WELDING APPARATUS, WELDING METHOD USING THE SAME, AND ELECTRODE ASSEMBLY MANUFACTURED BY THE WELDING METHOD

(71) Applicant: LG Energy Solution, Ltd., Seoul (KR)

(72) Inventors: Gil Sang Son, Daejeon (KR); Dong Yeon Kim, Daejeon (KR); Kyu Hyun Choi, Daejeon (KR); Jin Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/004,999

(22) PCT Filed: Jan. 7, 2022

(86) PCT No.: PCT/KR2022/000327
§ 371 (c)(1),
(2) Date: Jan. 10, 2023

(87) PCT Pub. No.: WO2022/149916
PCT Pub. Date: Jul. 14, 2022

(65) Prior Publication Data
US 2023/0339038 A1    Oct. 26, 2023

(30) Foreign Application Priority Data
Jan. 8, 2021  (KR) .......................... 10-2021-0002822

(51) Int. Cl.
*B23K 20/00* (2006.01)
*B23K 20/10* (2006.01)
(Continued)

(52) U.S. Cl.
CPC .......... *B23K 20/103* (2013.01); *B23K 20/106* (2013.01); *H01M 50/536* (2021.01); *H01M 50/54* (2021.01); *B23K 2101/38* (2018.08)

(58) Field of Classification Search
CPC .. B23K 20/103; B23K 2101/38; B23K 20/10; B23K 20/106; B23K 1/06; H01M 50/536; H01M 50/54; Y02E 60/10; Y02P 70/50
(Continued)

(56) References Cited

U.S. PATENT DOCUMENTS 4,577,089 A * 3/1986 Olson .................... B23K 37/02
219/136
2014/0061168 A1    3/2014 Nakakura et al.
(Continued)

FOREIGN PATENT DOCUMENTS

CN    106910941 A    6/2017
CN    108475756 A *    8/2018    ........ H01M 10/0431
(Continued)

OTHER PUBLICATIONS

International Search Report for Application No. PCT/KR2022/000327 mailed Apr. 22, 2022, pp. 1-3.
(Continued)

*Primary Examiner* — Kiley S Stoner
(74) *Attorney, Agent, or Firm* — Lerner David LLP

(57) ABSTRACT

The present invention relates to a welding apparatus including an electrode assembly configured such that a plurality of positive electrodes and a plurality of negative electrodes are stacked in the state in which separators are interposed therebetween, guides configured to reduce tensile force of positive electrode tabs and negative electrode tabs protruding from the electrode assembly, an anvil configured to allow the electrode tabs to be disposed thereon, and a horn configured to apply ultrasonic waves to the electrode tabs disposed on the anvil, a welding method using the same, and an electrode assembly manufactured by the welding method.

18 Claims, 7 Drawing Sheets

(51) Int. Cl.
*H01M 50/536* (2021.01)
*H01M 50/54* (2021.01)
*B23K 101/38* (2006.01)

(58) Field of Classification Search
USPC .............................................. 228/1.1, 110.1
See application file for complete search history.

(56) References Cited

U.S. PATENT DOCUMENTS

| | | | |
|---|---|---|---|
| 2015/0288026 A1 | 10/2015 | Yamamoto | |
| 2016/0141709 A1 | 5/2016 | Kim et al. | |
| 2019/0148705 A1 | 5/2019 | Park et al. | |
| 2019/0358739 A1* | 11/2019 | Hahnlen | ................ B23K 37/04 |
| 2021/0119304 A1 | 4/2021 | Ohta et al. | |
| 2022/0088708 A1 | 3/2022 | Park et al. | |

FOREIGN PATENT DOCUMENTS

| | | | | |
|---|---|---|---|---|
| CN | 209598414 U | | 11/2019 | |
| CN | 110524891 A | * | 12/2019 | .............. B22F 12/00 |
| CN | 110871332 A | * | 3/2020 | |
| DE | 29912490 U1 | * | 2/2001 | ............. B23K 20/10 |
| JP | 2005347158 A | * | 12/2005 | |
| JP | 2009187768 A | | 8/2009 | |
| JP | 2012104493 A | * | 5/2012 | |
| JP | 2018037333 A | | 3/2018 | |
| JP | 2019006060 A | * | 1/2019 | |
| JP | 2019179673 A | * | 10/2019 | |
| KR | 20030086070 A | | 11/2003 | |
| KR | 20160007109 A | | 1/2016 | |
| KR | 2018072065 A | * | 6/2018 | ........ H01M 10/0525 |
| KR | 20180072065 A | | 6/2018 | |
| KR | 20190054617 A | | 5/2019 | |
| KR | 20190116942 A | * | 10/2019 | |
| KR | 20200090498 A | | 7/2020 | |
| KR | 102145493 B1 | | 8/2020 | |
| KR | 20200105272 A | * | 9/2020 | |
| WO | WO-2013160932 A1 | * | 10/2013 | ........... B23K 26/244 |
| WO | WO-2019187941 A1 | * | 10/2019 | .............. H01M 4/13 |
| WO | WO-2020066240 A1 | * | 4/2020 | ............. B23K 20/10 |
| WO | WO-2022055317 A1 | * | 3/2022 | ............. B26D 7/086 |
| WO | WO-2022149916 A1 | * | 7/2022 | ............. B23K 20/10 |

OTHER PUBLICATIONS

Extended European Search Report including Written Opinion for Application No. 22736893.3 dated Aug. 4, 2023, pp. 1-6.

* cited by examiner

[FIG. 1]
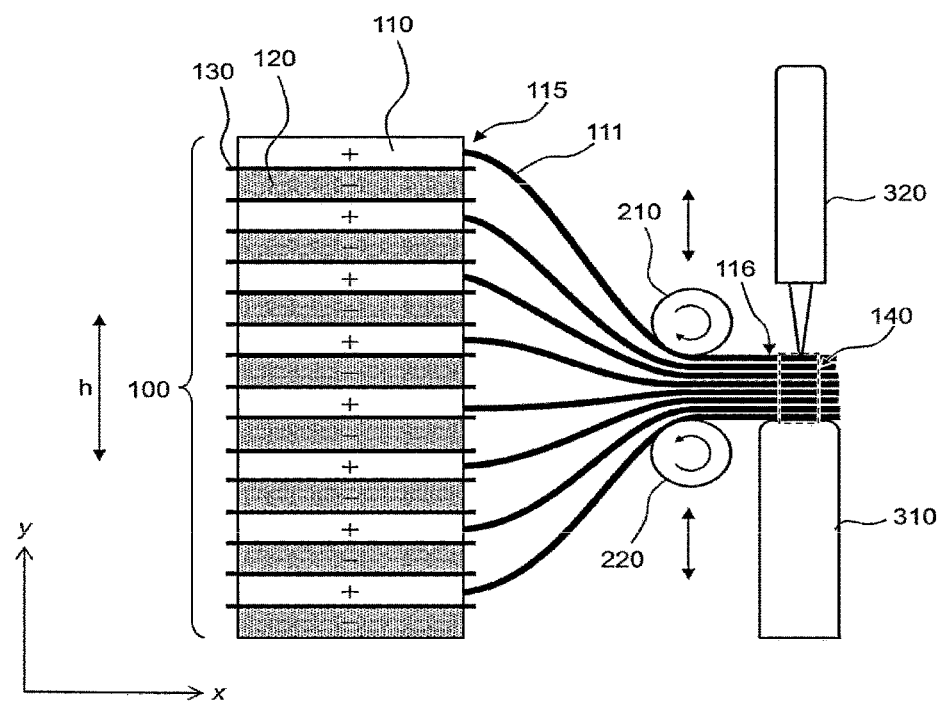
[FIG. 2]
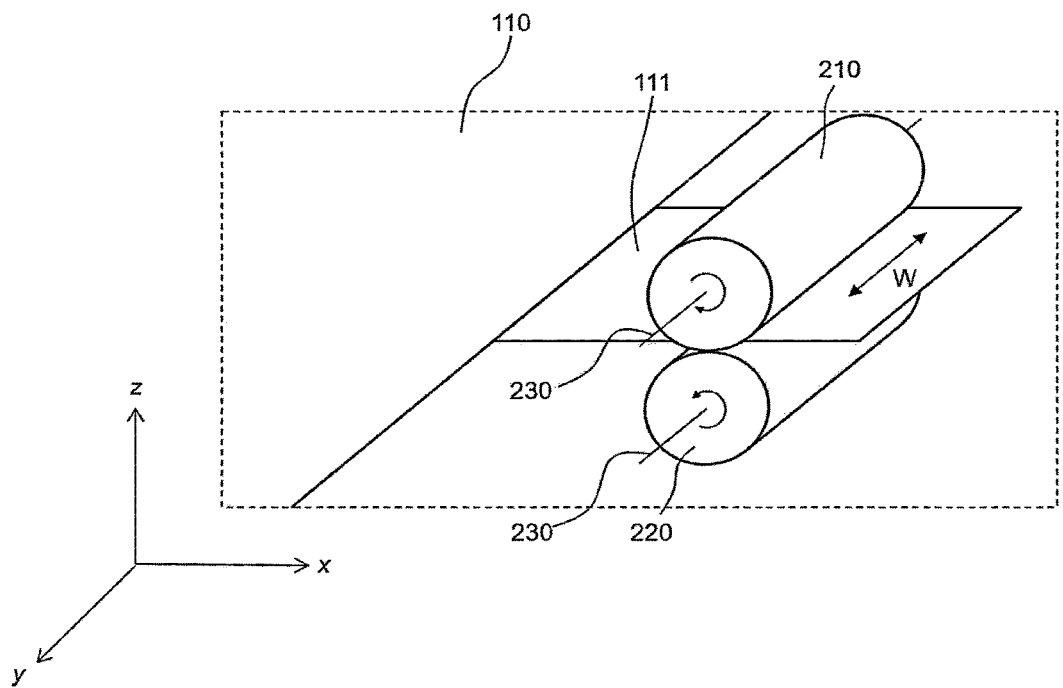

[FIG. 3]
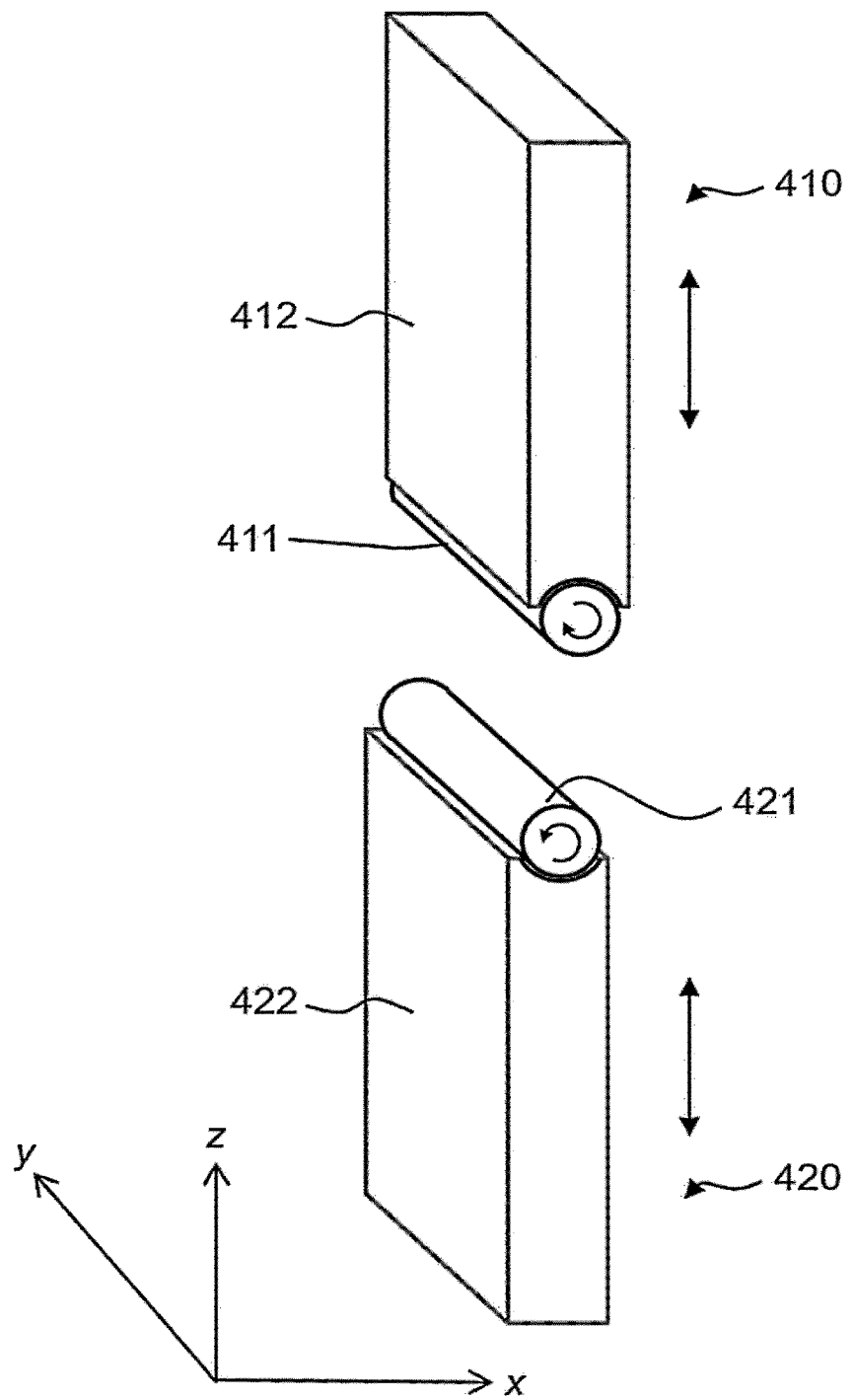

[FIG. 4]
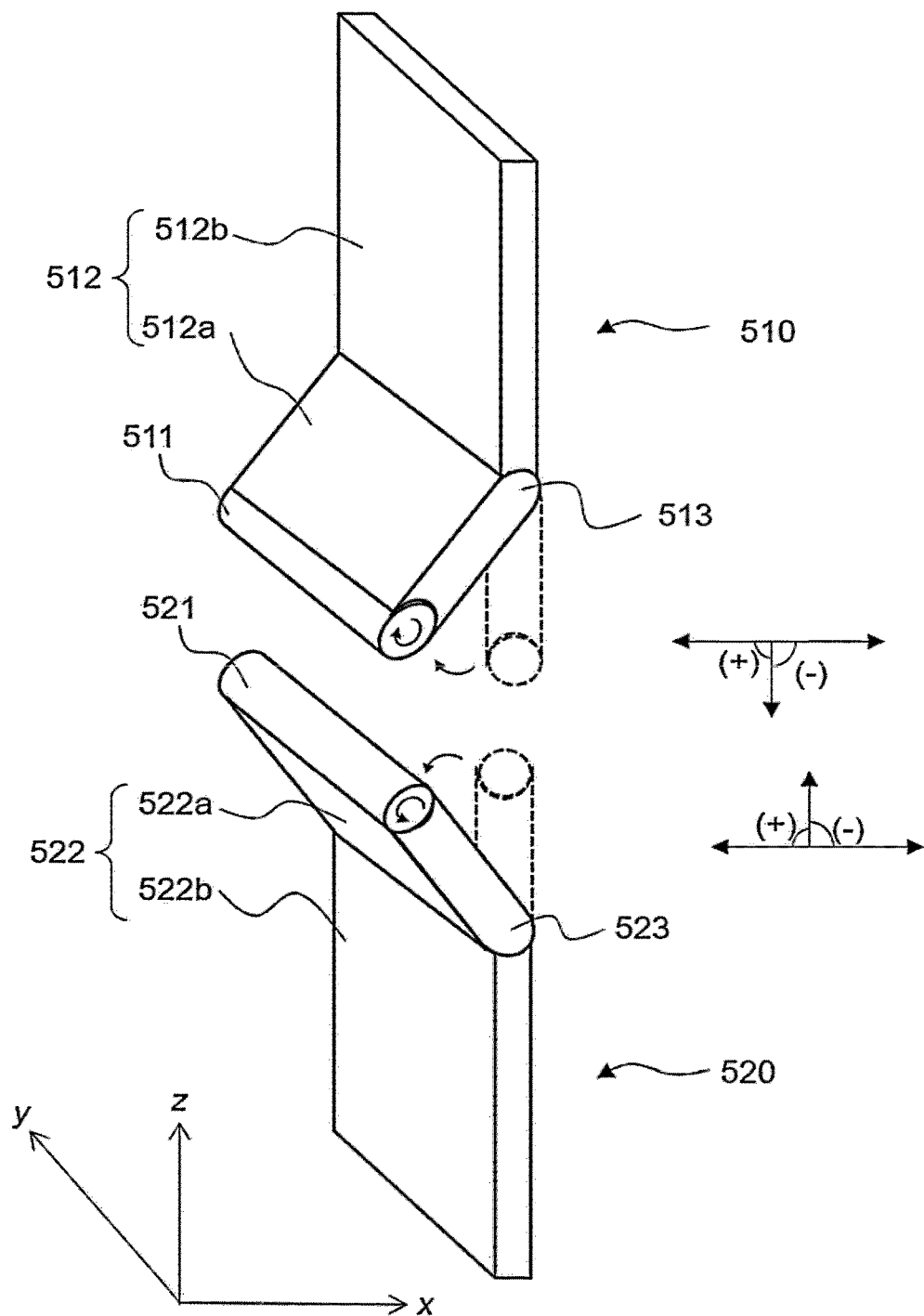

[FIG. 5]
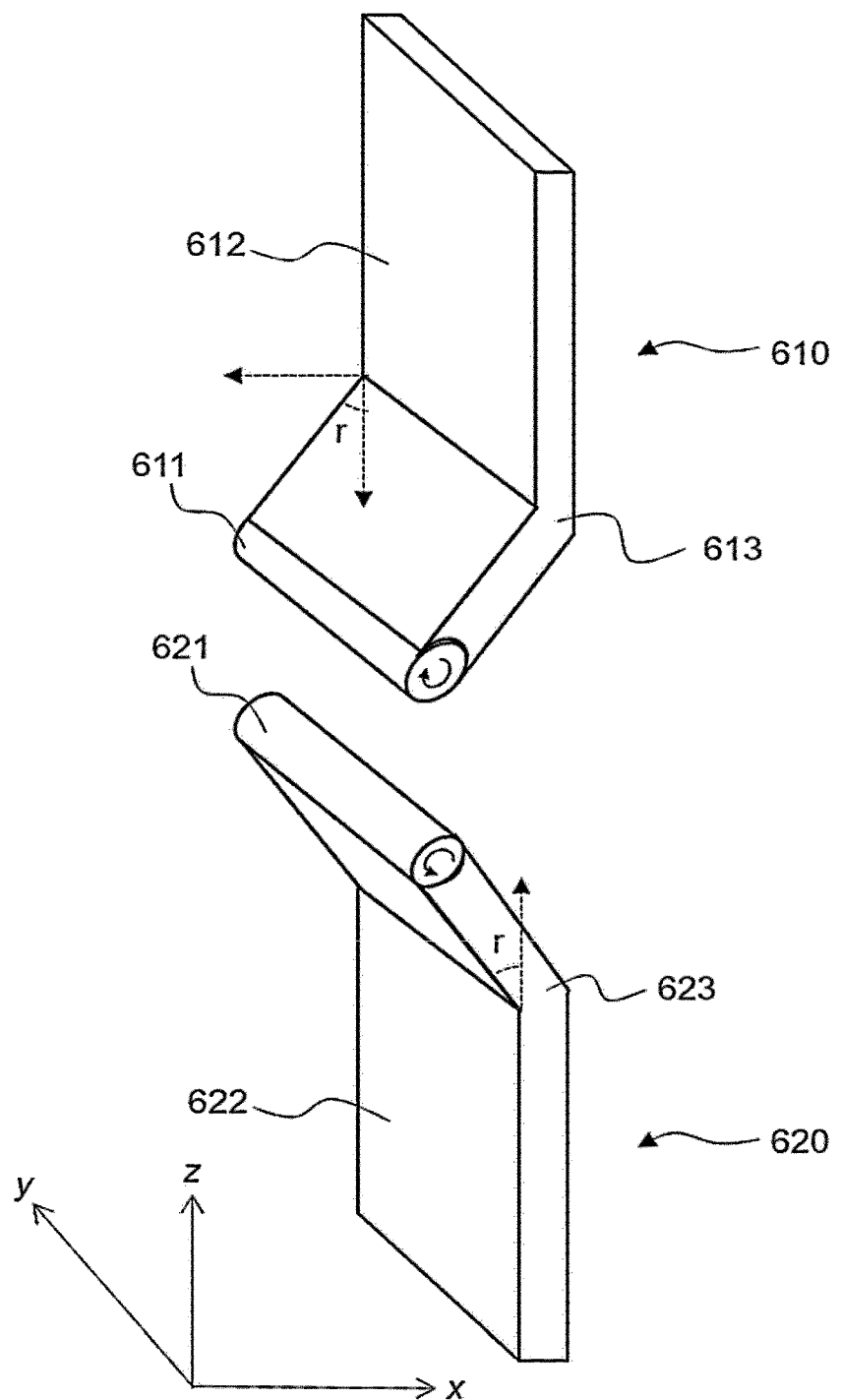

[FIG. 6]
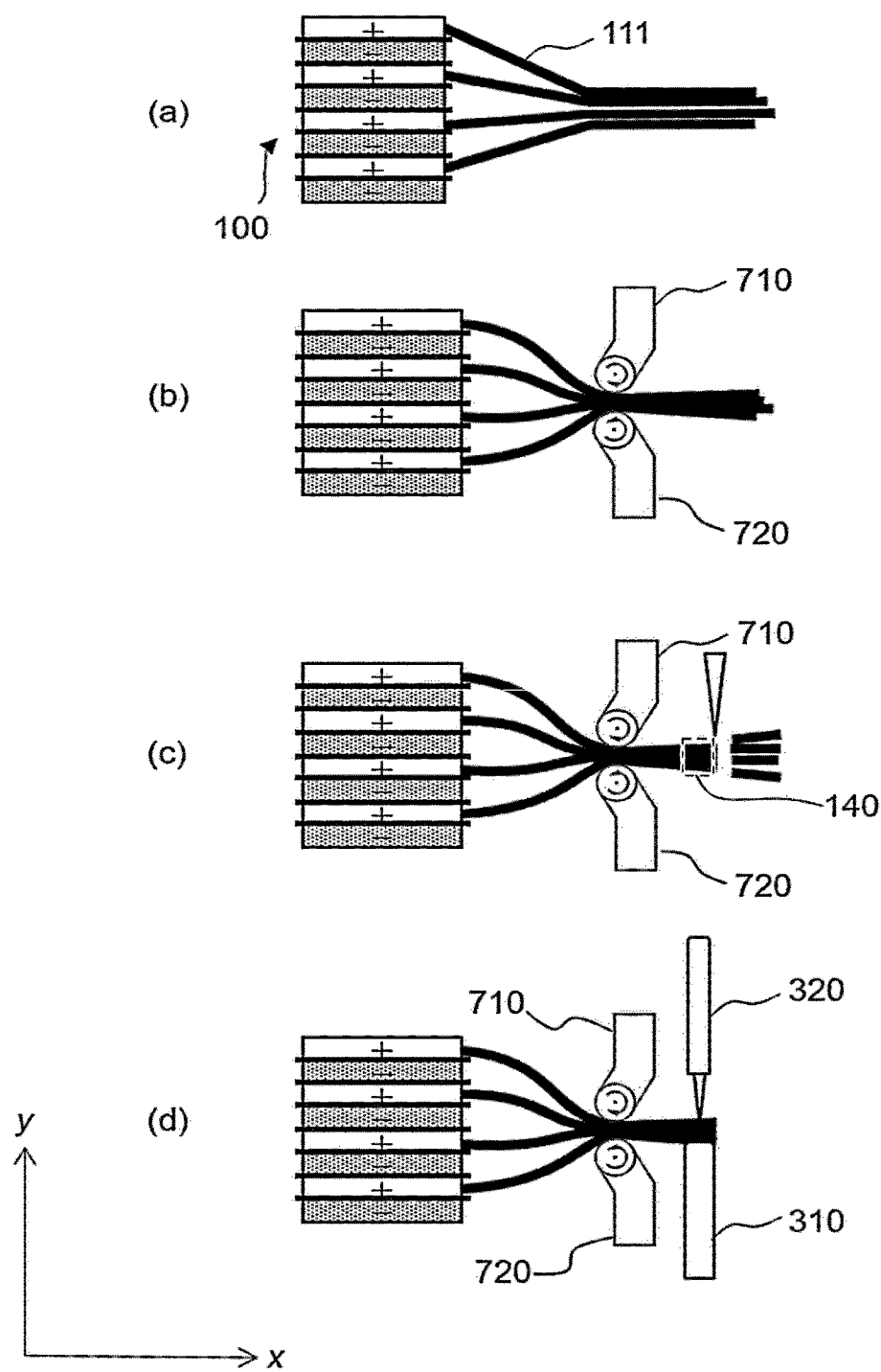

[FIG. 7]
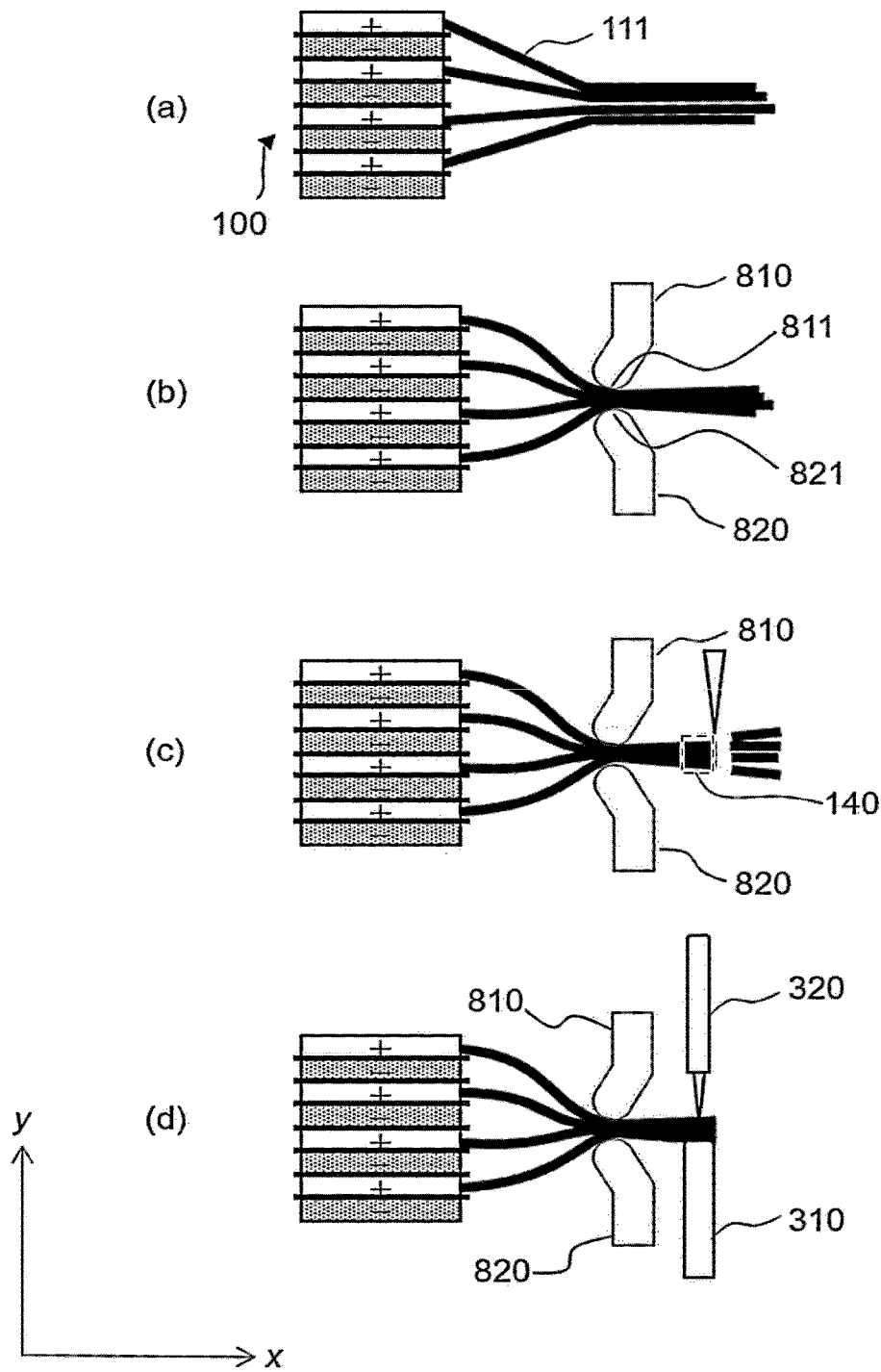

[FIG. 8]
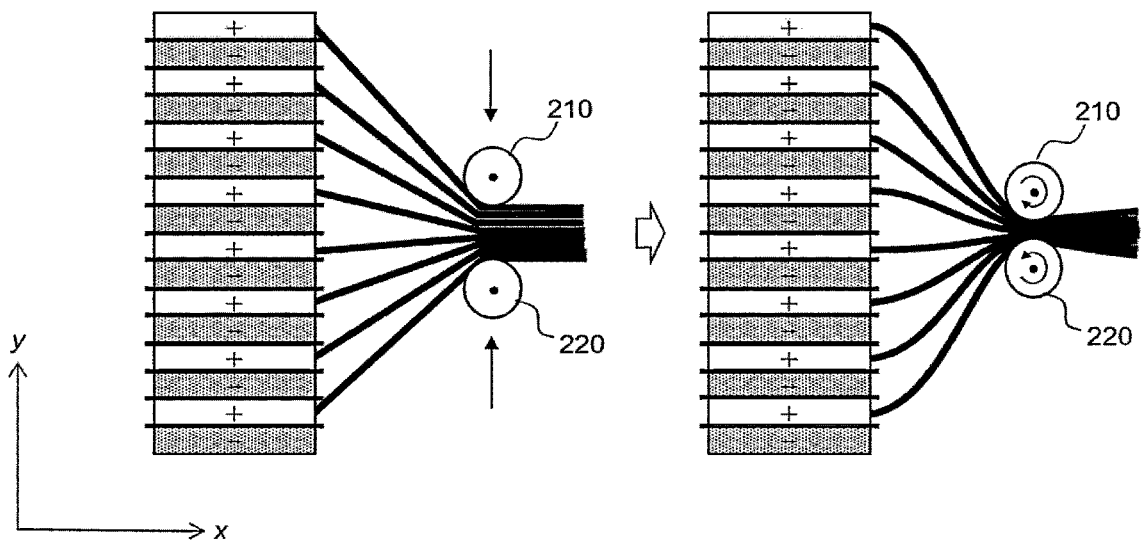
[FIG. 9]
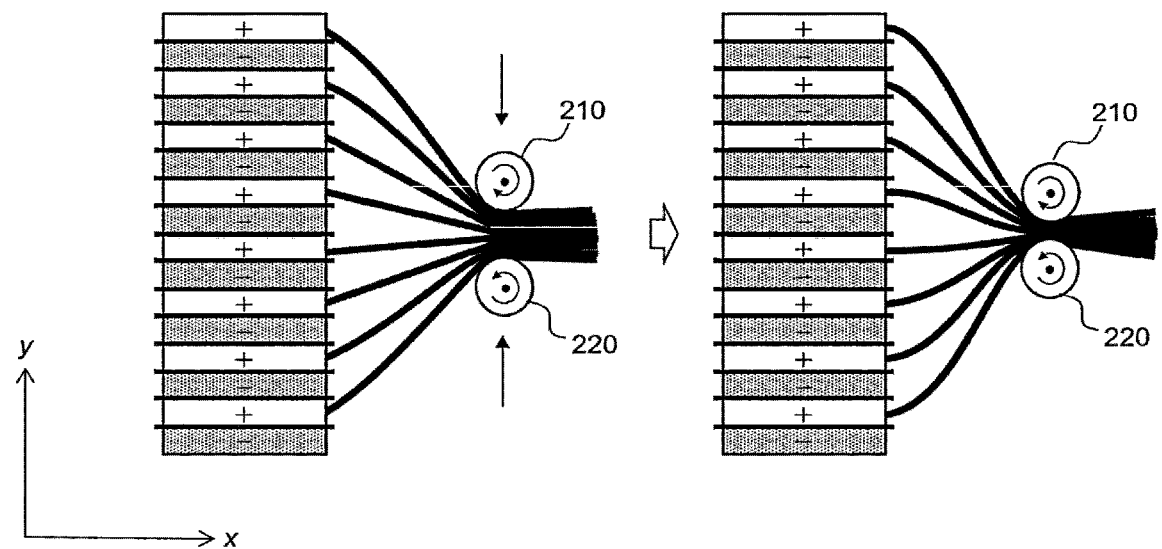

WELDING APPARATUS, WELDING METHOD USING THE SAME, AND ELECTRODE ASSEMBLY MANUFACTURED BY THE WELDING METHOD

CROSS-REFERENCE TO RELATED APPLICATIONS

This application is a national phase entry under 35 U.S.C. § 371 of International Application No.: PCT/KR2022/000327, filed on Jan. 7, 2022, which claims the benefit of priority to Korean Patent Application No. 10-2021-0002822 filed on Jan. 8, 2021, the disclosure of which is incorporated herein by reference in its entirety.

TECHNICAL FIELD

The present invention relates to a welding apparatus, a welding method using the same, and an electrode assembly manufactured by the welding method. More particularly, the present invention relates to a welding apparatus for welding electrode tabs of a stacked type electrode assembly in the state in which the electrode tabs are aligned such that tensile force applied to the electrode tabs is reduced, a welding method using the same, and an electrode assembly manufactured by the welding method.

BACKGROUND ART

In order to prevent acceleration of environmental pollution due to use of fossil fuels, research on nuclear energy, solar power, hydropower, wind energy, etc. as alternative energy sources has been intensively conducted.

A secondary battery is presented as an energy source capable of replacing fossil fuels. The secondary battery has advantages in that it is possible to repeatedly use the secondary battery through continuous charging and discharging and to greatly reduce the amount of carbon dioxide that is discharged from the secondary battery.

In addition, even for an energy storage system (ESS) configured to store idle power produced by solar power, hydropower, wind energy, etc. and to use the stored energy at the time of overload, the secondary battery is used as a power storage means, whereby it is possible to optimize power management.

Demand for a lithium secondary battery, which is a kind of secondary battery, has increased, since the lithium secondary battery is lightweight, has high energy density, and can be used as a high-output energy source.

The lithium secondary battery is charged and discharged through a process in which lithium ions from a positive electrode are reversibly intercalated into a negative electrode and the lithium ions are reversibly deintercalated from the negative electrode. The positive electrode and the negative electrode are stacked in the state in which a separator is interposed therebetween to constitute an electrode assembly.

The electrode assembly is received in a battery case together with an electrolyte to constitute the lithium secondary battery. Depending on the shape of the battery case, the lithium secondary battery may be classified as a pouch-shaped battery cell made of a laminate sheet including a resin layer and a metal layer, a prismatic battery cell including a prismatic battery case made of a metal material, or a cylindrical battery cell including a cylindrical battery case made of a metal material. Thereamong, the pouch-shaped battery cell is used as an energy source for various kinds of devices due to characteristics of the pouch-shaped battery cell in that the pouch-shaped battery cell is freely deformable and has high energy density.

The electrode assembly may be configured to have a structure in which at least one positive electrode and at least one negative electrode are stacked in the state in which a separator is interposed therebetween, wherein the positive electrode and the negative electrode respectively include a positive electrode tab and a negative electrode tab protruding outwards therefrom.

A process of welding electrode tabs that protrude as described above is called pre-welding. An electrode tab bundle is formed through the pre-welding process, and an electrode lead may be coupled to the electrode tab bundle so as to be used as an electrode terminal.

When welding is performed in the state in which the electrode tabs are tightened during alignment of the electrode tabs to form the electrode tab bundle, the electrode tabs may be easily fractured even though small impact is applied to the electrode tabs.

For this reason, various attempts to develop technology capable of improving safety of the electrode tabs have been made.

In connection therewith, Korean Patent Application Publication No. 2020-0105272 ("the '272 patent") discloses an electrode assembly manufacturing method including a loading process of locating a pair of loads on an electrode assembly side at a welding region, which is a portion at which electrode tabs are welded, and moving the pair of loads in a direction in which the loads face each other so as to be brought into tight contact with opposite sides of the electrode tabs before a pre-welding process of gathering and welding the electrode tabs. In the '272 patent, however, the pair of loads is used in order to prevent dust generated during the pre-welding process from moving to the electrode assembly.

Also, in the '272 patent, tensile force may be applied in a direction in which the electrode tabs are stretched during the loading process, whereby safety of the electrode tabs may be lowered.

Korean Patent Application Publication No. 2018-0072065 ("the '065 patent") discloses a battery cell manufacturing method including a process of preparing an electrode assembly including electrode plates having electrode tabs formed thereon and pressing the electrode tabs in an upward-downward direction using a guide jig at a point at which the distance from an end of the electrode assembly is within ⅕ of the thickness of the electrode assembly and a pre-welding process of forming a welding portion at parts of the electrode tabs pressed by the guide jig that are adjacent to the region at which the guide jig is located.

In the '065 patent, the process of pressing the electrode tabs using the guide jig is included as a step before pre-welding. However, the above process is performed in order to effectively reduce a dead space of the welding portion of the electrode tabs, and a process of preventing damage to the electrode tabs is not disclosed.

Therefore, there is a high necessity for technology capable of reducing tensile force applied to electrode tabs during a pre-welding process for forming an electrode tab bundle.

DISCLOSURE

Technical Problem

The present invention has been made in view of the above problems, and it is an object of the present invention to provide a welding apparatus capable of, in an electrode assembly including an electrode tab bundle formed by welding electrode tabs, deforming the electrode tabs so as to be loosened, whereby it is possible to form a welding region in the state in which the length of the electrode tabs extending to the welding region is increased, a welding method using the same, and an electrode assembly manufactured by the welding method.

Technical Solution

In order to accomplish the above object, the present invention provides a welding apparatus for manufacture of electrode assemblies, the welding apparatus including an electrode assembly configured such that a plurality of positive electrodes and a plurality of negative electrodes are stacked in the state in which separators are interposed therebetween, a guide configured to reduce tensile force of electrode tabs protruding from the electrode assembly, a lower welding unit disposed under the electrode tabs, and an upper welding unit disposed above the electrode tabs.

The lower welding unit may be an anvil configured to allow the electrode tabs to be disposed thereon, and the upper welding unit may be a horn configured to apply ultrasonic waves to the electrode tabs disposed on the anvil.

The lower welding unit and the upper welding unit may constitute a single welding means, and all conventional means configured to couple electrode tabs to each other, such as electron beam welding and laser welding, as well as ultrasonic welding, which is frictional welding, may be used.

The guide may include a first guide located above the electrode tabs and a second guide located under the electrode tabs, and the first guide and the second guide may be moved so as to be close to each other or to be away from each other.

Each of the first guide and the second guide may include a rotary portion formed in a roller shape or a curved portion including a curved surface, and a rotation axis of the rotary portion may be parallel to the width of each of the electrode tabs.

Each of the first guide and the second guide may further include a main body portion having the rotary portion or the curved portion coupled to one end thereof.

The main body portion may include a bent portion, and the main body portion may be bent at the bent portion or may be rotatable about a rotation axis of the bent portion.

The rotary portion of the first guide and the rotary portion of the second guide may be rotated in opposite directions in order to push the electrode tabs in a direction toward the electrode assembly.

Rotational force of the rotary portion may be provided by repulsive force generated due to a magnetic field. Alternatively, the rotational force of the rotary portion may also be provided by rotation of a motor.

Welding by the upper welding unit and the lower welding unit may be started in the state in which the electrode tabs are aligned by the guide. Specifically, ultrasonic waves may be applied to the horn in the state in which the electrode tabs are aligned by the guide.

In addition, the present invention provides a welding method using the welding apparatus. Specifically, the welding method includes (a) preparing an electrode assembly, (b) pushing, by a guide, electrode tabs in a direction toward the electrode assembly while bringing the electrode tabs into tight contact with each other, and (c) disposing a welding region of the electrode tabs between the upper welding unit and the lower welding unit and welding the electrode tabs, wherein the guide includes a first guide located above the electrode tabs and a second guide located under the electrode tabs.

Meanwhile, a step of removing parts of the electrode tabs outside the welding region may be added between step (b) and step (c).

Step (b) may be performed through a process of pushing the electrode tabs in the direction toward the electrode assembly in the state in which the first guide and the second guide have been moved so as to be close to each other.

Step (b) may be performed through a process of pushing the electrode tabs in the direction toward the electrode assembly while the first guide and the second guide are being moved so as to be close to each other.

A rotary portion of the first guide and a rotary portion of the second guide may be rotated in opposite directions in order to push the electrode tabs in the direction toward the electrode assembly.

The electrode tabs may be aligned in a loosened state through step (b).

In addition, the present invention provides an electrode assembly manufactured by the welding method.

The electrode assembly according to the present invention is an electrode assembly configured such that a plurality of positive electrodes and a plurality of negative electrodes are stacked in the state in which separators are interposed therebetween, wherein the plurality of positive electrodes and the plurality of negative electrodes comprise electrode tabs protruding outwards therefrom, each of the electrode tabs includes a first point at which the electrode tab is connected to an electrode plate and a second point at which a welding region at which the electrode tabs are coupled to form a bundle begins, and the length from the first point to the second point of the electrode tab is greater than the shortest length between the first point and the second point.

The length from the first point to the second point of the electrode tab may be greater by greater than 0 mm to less than 2 mm than the shortest length between the first point and the second point or may be greater than 0.0% to less than 14.3% of the shortest length between the first point and the second point.

In addition, the present invention may provide various combinations of the above solving means.

Advantageous Effects

As is apparent from the above description, in the present invention, electrode tabs are aligned using guides, whereby it is possible to perform pre-welding in the state in which tensile force of the electrode tabs is low.

Since pre-welding is performed in the state in which the electrode tabs are loosened by the guides, it is possible to prevent or delay the electrode tabs from being in a tightened state even though the thickness of an electrode assembly is changed by charging and discharging.

Also, in the present invention, a difference between the extended electrode tabs depending on length is derived, whereby breakage of the electrode tabs does not occur while folding defects of the electrode tabs do not occur.

In addition, it is possible to obtain an effect of further securing the length of the electrode tabs necessary until the electrode tabs are ruptured even though external force applied to the electrode tabs.

As described above, it is possible to increase the length to the welding region of the electrode tabs extending from electrodes, whereby it is possible to prevent rupture and breakage of the electrode tabs.

DESCRIPTION OF DRAWINGS

FIG. 1 is a side view of an electrode assembly and a welding apparatus according to the present invention.

FIG. 2 is a perspective view of guides according to a first embodiment.

FIG. 3 is a perspective view of guides according to a second embodiment.

FIG. 4 is a perspective view of guides according to a third embodiment.

FIG. 5 is a perspective view of guides according to a fourth embodiment.

FIG. 6 shows an example of the sequence of a welding method according to the present invention.

FIG. 7 shows another example of the sequence of the welding method according to the present invention.

FIG. 8 is a side view showing a process of pushing electrode tabs in a direction toward an electrode assembly in the state in which guides have been moved so as to be close to each other.

FIG. 9 is a side view showing a process of pushing electrode tabs in a direction toward an electrode assembly while guides are being moved so as to be close to each other.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is a side view of an electrode assembly and a welding apparatus according to the present invention.

Referring to FIG. 1, the welding apparatus according to the present invention is a welding apparatus for manufacture of electrode assemblies, which may be used to weld a plurality of electrode tabs so as to become a single electrode tab bundle in the state in which the electrode tabs are disposed so as to overlap each other in a thickness direction.

Specifically, the welding apparatus may include an electrode assembly 100 configured such that a plurality of positive electrodes 110 and a plurality of negative electrodes 120 are stacked in the state in which separators 130 are interposed therebetween, guides 210 and 220 configured to reduce tensile force of positive electrode tabs 111 and negative electrode tabs protruding from the electrode assembly 100, an anvil 310 configured to allow the electrode tabs to be disposed thereon, and a horn 320 configured to apply ultrasonic waves to the electrode tabs disposed on the anvil 310.

The guides 210 and 220 may include a first guide 210 located above the electrode tabs and a second guide 220 located under the electrode tabs, and each of the first guide 210 and the second guide 220 may be moved in an upward-downward direction. Consequently, the guides may be moved so as to be closer to each other or to be farther away from each other.

The first guide 210 and the second guide 220 are moved toward the electrode tabs, and are rotated in a direction in which the electrode tabs are pushed in a direction toward the electrode assembly in the state in which the distance therebetween is the smallest, wherein the first guide 210 and the second guide 220 are rotated in opposite directions.

Specifically, in the case in which the electrode assembly is located on the left side and the electrode tabs are located on the right side, as shown in FIG. 1, the first guide 210 is rotated in a clockwise direction and the second guide 220 is rotated in a counterclockwise direction, whereby the electrode tabs are pushed in the direction toward the electrode assembly.

Alternatively, in the case in which the electrode assembly is located on the right side and the electrode tabs are located on the left side, the first guide 210 is rotated in the counterclockwise direction and the second guide 220 is rotated in the clockwise direction, whereby the electrode tabs are pushed in the direction toward the electrode assembly.

When the electrode tabs are pushed in the direction toward the electrode assembly, the electrode tabs are loosened. In the state in which the electrode tabs are aligned by the guides, as described above, the electrode tabs may be disposed between the horn and the anvil, and ultrasonic waves may be applied to the horn, whereby pre-welding may be performed.

Although only the positive electrode tabs 111 are described with reference to FIG. 1, the welding apparatus according to the present invention, a welding method using the same, and an electrode assembly manufactured by the welding method may also be equally applied to the negative electrode tabs. In addition, although ultrasonic welding using the anvil 310 and the horn 320 is described with reference to FIG. 1, all conventional means configured to couple the electrode tabs to each other, such as electron beam welding and laser welding, as well as ultrasonic welding, which is frictional welding, may be used.

The positive electrode tabs 111 may protrude from the positive electrodes 110 in one direction, and the negative electrode tabs may protrude from the negative electrodes 120 in a direction opposite the direction in which the positive electrode tabs 111 protrude or the same direction as the direction in which the positive electrode tabs protrude. In the drawings of this specification, the negative electrode tabs are omitted for convenience of description.

A description of the positive electrode tabs described in this specification may be equally applied to alignment of the negative electrode tabs, securing of the lengths of the negative electrode tabs using the guides, and welding of the negative electrode tabs. In addition, a plurality of positive electrode tabs and a plurality of negative electrode tabs may protrude respectively from a single positive electrode stack and a single negative electrode stack, to which a description of the positive electrode tabs described in this specification may also be equally applied.

The positive electrode tabs 111 may be formed on the plurality of positive electrodes at the same positions, wherein the positive electrode tabs may be aligned so as to overlap each other in the thickness direction. Before the overlapping positive electrode tabs 111 are coupled to a positive electrode lead, a pre-welding process in which the positive electrode tabs are coupled to form a positive electrode tab bundle is performed.

For the electrode assembly shown in FIG. 1, only one welding region 140 for pre-welding is formed at a central part of the electrode assembly 100 in a height direction h, whereby the distance from the electrode tab of each of the uppermost electrode and the lowermost electrode to the welding region 140 is the longest. In addition, when pre-welding is performed in the state in which the outermost electrode tabs are tightened, fracture may easily occur.

In addition, when the electrode assembly 100 swells as charging and discharging are performed, the distance between the outermost electrode tabs and the welding region 140 may be increased, whereby the outermost electrode tabs may be further tightened. As a result, there is a high danger of the outermost electrode tabs being damaged.

Otherwise, when a coupling portion between the electrode tab bundle and the electrode lead moves in a direction in which the coupling portion is away from the electrodes of the electrode assembly during use of a battery cell, all of the electrode tabs are tightened, whereby a danger of fracture may be increased.

The position of the welding region at the electrode tab bundle according to the present invention encompasses the case in which the welding region is formed at an upper end or a lower end of the electrode assembly in the height direction or two or more electrode tab bundles are formed as well as the case in which the welding region is formed at the central part of the electrode assembly in the height direction, as in the electrode assembly shown in FIG. 1.

Specifically, in the case in which the welding region is formed at the upper end of the electrode assembly in the height direction (y-axis direction), the lengths of the electrode tabs may be gradually increased from the upper end to the lower end of the electrode assembly, and in the case in which the welding region is formed at the lower end of the electrode assembly in the height direction (y-axis direction), the lengths of the electrode tabs may be gradually decreased from the upper end to the lower end of the electrode assembly. Irrespective of the lengths of the electrode tabs, however, tensile force of the electrode tabs located at the uppermost end and the lowermost end of the electrode assembly may be the most greatly increased, and greater tensile force may be applied to short electrode tabs than long electrode tabs.

Accordingly, the present invention proposes a welding apparatus and a welding method that perform pre-welding after the electrode tabs are aligned such that a first point 115 of the electrode tabs at which the electrode tabs are connected to electrode plates and a second point 116 of the electrode tabs at which the welding region 140 begins are loosened in the state in which the electrode tabs are disposed so as to overlap each other using the guides.

In the electrode assembly manufactured using the welding apparatus and a welding method, the length from the first point 115 of the electrode tabs to the second point 116 of the electrode tabs may be greater than the shortest length between the first point 115 and the second point 116.

In the present invention, it has been found that, in extending the electrode tabs, the electrode tabs may be folded at the time of assembly if the electrode tabs are excessively extended, whereby defects, such as breakage, may occur. As can be seen from the following embodiment, the length from the first point of the electrode tabs to the second point of the electrode tabs may be greater by greater than 0 mm to less than 2 mm than the shortest length between the first point and the second point, or may be greater than 0.0% to less than 14.3% of the shortest length between the first point and the second point.

FIG. 2 is a perspective view of guides according to a first embodiment.

Referring to FIG. 2, a first guide 210 and a second guide 220 are disposed in the state in which an electrode tab is interposed therebetween. Although FIG. 2 shows one positive electrode 110 and one positive electrode tab 111 for convenience of description, the first guide 210 and the second guide 220 may be disposed in the state in which a plurality of electrode tabs protruding from an electrode assembly is interposed therebetween, as in FIG. 1.

Each of the first guide 210 and the second guide 220 includes a rotary portion formed in the shape of a roller, and a rotation axis 230 of the rotary portion is disposed parallel to the width W of the electrode tab. Based on FIG. 2, the rotation axis of the rotary portion is disposed parallel to a y-axis.

The first guide 210 is rotated in the clockwise direction and the second guide 220 is rotated in the counterclockwise direction, whereby the positive electrode tab 111 is pushed in a direction toward the positive electrode 110.

Each of the first guide and the second guide according to the present invention may include a rotary portion formed in the shape of a roller or a curved portion including a curved surface. FIGS. 1 to 6, 8, and 9 show the rotary portion, and FIG. 7 shows the curved portion. For the curved portion, the curved portion is provided at a distal end of a bent portion without a separate roller.

FIG. 3 is a perspective view of guides according to a second embodiment.

Referring to FIG. 3, a first guide 410 and a second guide 420 are individually movable in the upward-downward direction so as to be moved closer to each other or to be farther away from each other, wherein rotary portions 411 and 421 configured to push an electrode tab in a direction toward an electrode are coupled to main body portions 412 and 422, respectively.

That is, a driving portion may be added to each of the main body portions 412 and 422 such that the first guide 410 and the second guide 420 are movable in the upward-downward direction, and each of the rotary portions 411 and 421 is coupled to one end of a corresponding one of the main body portions 412 and 422 in a direction in which the rotary portion comes into contact with the electrode tab.

In the structure in which the rotary portion is coupled to the main body portion, which is formed in an approximately rectangular parallelepiped shape, as shown in FIG. 3, the rotary portion may be rotated in the state in which the rotary portion is more strongly pushed in a direction toward the electrode tab.

FIG. 4 is a perspective view of guides according to a third embodiment.

Referring to FIG. 4, the guides include a first guide 510 and a second guide 520.

The first guide 510 and the second guide 520 include main body portions 512 and 522 and rotary portions 511 and 521, respectively, and the main body portions 512 and 522 are bendable.

Specifically, when the first guide 510 and the second guide 520 are moved toward an electrode tab bundle so as to be close to each other, the main body portions 512 and 522 may be straight when viewed from the side, and after the main body portions 512 and 522 come into contact with the electrode tab bundle, main body portions 512*a* and 522*a* respectively including the rotary portions 511 and 521 may be rotated about rotation axes of bent portions 513 and 523 in directions indicated by arrows.

As described above, the rotary portions deform electrode tabs so as to be loosened while pushing the electrode tabs, whereby the electrode tabs are pushed in a direction opposite to the welding region, and therefore it is possible to secure a larger length between the first point of the electrode tabs to the second point of the electrode tabs.

Also, in the case in which the main body portions are bendable, it is possible to individually control the rotation angle and rotation speed of the first guide and the second guide depending on the position at which the welding region is formed in the height direction of the electrode assembly, and therefore the target of use may not be limited to an electrode assembly having a specific shape.

In addition, the electrode tabs may be pushed in the direction toward the electrodes by rotation of the main body portions after contact with the electrode tab bundle as well as rotation of the rotary portions, and therefore a synergistic effect may be expected in deforming the electrode tabs in a loosened state.

In a concrete example, the guides may be configured to have a structure in which the parts of the guides that contact the electrode tab bundle are not rotated and in which the bent portions are formed at the main body portions and the main body portions are rotated about the rotation axes of the bent portion.

Specifically, the guides include the first guide and the second guide, the first guide and the second guide, each of which is straight when viewed from the side, are moved toward the electrode tab bundle in a direction in which the first guide and the second guide become close to each other, and parts of the main body portions of the first guide and the second guide contacting the electrode tab bundle may push the electrode tab bundle in the direction toward the electrode assembly while being rotated about the rotation axes of the bent portion in the direction toward the electrode assembly.

In the guides shown in FIG. 4, the rotational force of the main body portions 512*a* and 522*a* including the rotary portions may be provided by repulsive force generated due to magnetic fields, wherein magnetic fields having the same polarity are formed in the main body portion 512*a* of the first guide having the rotary portion 511 coupled thereto and the main body portion 522*a* of the second guide having the rotary portion 521 coupled thereto, and the main body portions may be rotated in the clockwise direction and the counterclockwise direction, respectively, by repulsive force generated therebetween.

Additionally, in the guides according to the third embodiment, the main body portions 512*a* and 522*a* having the rotary portions coupled thereto may be rotated not only by a positive (+) angle, which is the left side, but also by a negative (−) angle, which is the right side, relative to main body portions 512*b* and 522*b*, respectively.

When the rotary portions 511 and 521 come into contact with the electrode tab bundle in the state in which the main body portions 512*a* and 522*a* are rotated by the negative (−) angle, therefore, the main body portions 512*a* and 522*a* are rotated by the positive (+) angle, and the rotary portion 511 is rotated in the clockwise direction while the rotary portion 521 is rotated in the counterclockwise direction, whereby the electrode tabs may be pushed in the direction toward the electrode assembly.

FIG. 5 is a perspective view of guides according to a fourth embodiment.

Referring to FIG. 5, the guides include a first guide 610 and a second guide 620.

The first guide 610 and the second guide 620 include main body portions 612 and 622 and rotary portions 611 and 621, respectively, and the main body portions 612 and 622 include bent portions 613 and 623, respectively.

The main body portions 612 and 622 are bent at the bent portions 613 and 623, respectively, so as to have an internal angle r of less than 90 degrees. The first guide 610 and the second guide 620 are disposed between a welding region of an electrode assembly having electrode tabs extending therefrom, and the main body portions bent at the bent portions and the rotary portions are disposed in a direction toward the electrode assembly.

In the case in which the guides including the bent portions are used, as described above, the rotary portions 611 and 621 start to be rotated while coming into contact with an electrode tab bundle, whereby the electrode tabs may be pushed in the direction toward the electrode assembly. In addition, it is possible to move the electrode tab bundle so as to be longer in the direction toward the electrode assembly, compared to the guides shown in FIG. 3, which include the straight main bodies when viewed from the side.

FIGS. 3 to 5 show the case in which the guides are applied when the electrode assembly is located on the left side and the electrode tabs are located on the right side, wherein the rotary portion of the first guide is rotated in the clockwise direction, and the rotary portion of the second guide is rotated in the counterclockwise direction, whereby the electrode tab is pushed in the direction toward the electrode As a concrete example, FIG. 6 shows an example of the sequence of a welding method according to the present invention.

Referring to FIG. 6, the welding method according to the present invention may include (a) a step of preparing an electrode assembly 100, (b) a step of pushing, by guides, positive electrode tabs 111 in a direction toward the electrode assembly 100 while bringing the positive electrode tabs 111 into tight contact with each other, (c) a step of removing parts of the positive electrode tabs 111 outside a welding region 140, and (d) a step of disposing the welding region 140 of the positive electrode tabs 111 between a horn 320 and an anvil 310 and welding the positive electrode tabs 111, wherein the guides may include a first guide 710 located above the positive electrode tabs 111 and a second guide 720 located under the positive electrode tabs 111.

In step (b), a rotary portion of the first guide 710 is rotated in the clockwise direction, and a rotary portion of the second guide 720 is rotated in the counterclockwise direction, whereby the electrode tabs are pushed in the direction toward the electrode assembly, and therefore the electrode tabs may be aligned while being deformed from a tightened state to a loosened state.

FIG. 7 shows another example of the sequence of the welding method according to the present invention. The welding method of FIG. 7 is identical to the welding method of FIG. 6 except that the first guide 710 and the second guide 720 are replaced with a first guide 810 and a second guide 820, each of which includes a bent portion without addition of a rotary portion. FIG. 7 shows guides having curved portions 811 and 821 added thereto. Even in the case in which the curved portions 811 and 821 formed by inclination of the bent portions and curved surfaces of distal ends without the rotary portions are used, electrode tabs may be aligned while being deformed from a tightened state to a loosened state.

FIG. 8 is a side view showing a process of pushing electrode tabs in a direction toward an electrode assembly in the state in which guides have been moved so as to be close to each other.

Referring to FIG. 8, a process of pushing the electrode tabs in the direction toward the electrode assembly in the state in which a first guide 210 and a second guide 220 have been moved so as to be close to each other may be performed.

That is, the first guide 210 and the second guide 220 may be moved downwards and upwards, respectively, toward the electrode tabs in the state in which rotary portions are not rotated, and rotation of the rotary portions may be started in the state in which the electrode tabs are pushed.

FIG. 9 is a side view showing a process of pushing electrode tabs in a direction toward an electrode assembly while guides are being moved so as to be close (or relatively closer) to each other.

Referring to FIG. 9, step (b) may be performed through a process of pushing the electrode tabs in the direction toward the electrode assembly while a first guide 210 and a second guide 220 are being moved so as to be close (or relatively closer) to each other.

That is, rotation of rotary portions of the first guide 210 and the second guide 220 may be started while the rotary portions come into contact with the outermost electrode tabs, and the rotary portions may be continuously rotated even in a process of pushing the electrode tabs such that the distance between the first guide 210 and the second guide 220 is the smallest.

In the case in which the above method is used, it is possible to greatly obtain an effect of deforming the outermost electrode tabs so as to be loosened.

<Comparison in Effect Due to Extension in Length of Outermost Tabs>

Electrode tabs were welded in the state in which the length of the outermost electrode tabs was extended using the welding apparatus for manufacture of electrode assemblies according to the present invention, were connected to an electrode lead, and were received in a pouch case, whereby a pouch-shaped battery was completed.

The electrode assembly used at this time was manufactured by stacking unit cells, each of which includes a positive electrode, a separator, a negative electrode, and a separator. The smallest length of the outermost tabs, i.e. the length from a first point 115 to a second point 116, was 14 mm, and Table 1 below shows the increased length of the outermost tabs in each case. Increased length percentage (%) is a value obtained by dividing the length (mm) from the first point 115 to the second point 116 by the increased length (mm) of the outermost tabs.

For Examples and Comparative Examples according to Table 1, whether tab folding occurs in the completed pouch-shaped battery was checked through computerized tomography (CT) image capturing. The CT image capturing was performed using an X-ray CT apparatus. If the tab length is excessively increased, folding may occur in the battery at the time of assembly of the battery, which may easily lead to a breakage defect due to external force during assembly of a module or a pack or during a charging/discharging process.

For Examples and Comparative Examples according to Table 1, 1000 cycles of charging/discharging were performed at 50° C., and the pouch cells were exploded in order to check whether the tabs were broken. In Examples and Comparative Examples, 0.5 C constant current charging was performed, constant voltage charging was performed after reaching 4.2 V, and charging was finished when current reached 0.05 C. Discharging was performed at 0.5 C constant current until reaching 3 V.

For tab folding and breakage, 10 identical samples were inspected, and the results are shown in Table 1.

TABLE 1

| | Increased length of outermost tabs (mm) | Increased length percentage (%) | Tab folding defect | Tab breakage defect |
|---|---|---|---|---|
| Comparative Example 1 | 0 | 0.0 | 0/10 | 4/10 |
| Example 1 | 0.5 | 3.6 | 0/10 | 0/10 |
| Example 2 | 1 | 7.1 | 0/10 | 0/10 |
| Example 3 | 1.5 | 10.7 | 0/10 | 0/10 |
| Comparative Example 2 | 2 | 14.3 | 1/10 | 1/10 |
| Comparative Example 3 | 3 | 21.4 | 5/10 | 5/10 |
| Comparative Example 4 | 4 | 28.6 | 8/10 | 8/10 |

It can be seen that, when the length of the outermost tabs was increased by greater than 0 mm to less than 2 mm or so as to be greater than 0.0% to less than 14.3% of the shortest length of the outermost tabs using the welding apparatus for manufacture of electrode assemblies according to the present invention, tab folding did not occur and that tab breakage did not occur during use of the batteries.

For Comparative Example 1, tab folding defects did not occur, since the length of the outermost tabs was not increased; however, tab breakage defects occurred during assembly of the batteries or during use of the batteries. For Comparative Examples 2 and 3, the length of the outermost tabs was excessively increased, whereby tab folding occurred during assembly of the batteries, from which it can be seen that long-term stability and performance of the batteries may be affected.

Those skilled in the art to which the present invention pertains will appreciate that various applications and modifications are possible within the category of the present invention based on the above description.

DESCRIPTION OF REFERENCE SYMBOLS

100: Electrode assembly
110: Positive electrode
111: Positive electrode tab
115: First point
116: Second point
120: Negative electrode
130: Separator 140: Welding region
210, 410, 510, 610, 710, 810: First guides
220, 420, 520, 620, 720, 820: Second guides
811, 821: Curved portions
230: Rotation axis
310: Anvil
320: Horn
411, 421, 511, 521, 611, 621: Rotary portions
412, 422, 512, 512a, 512b, 522, 522a, 522b, 612, 622: Main body portions
513, 523, 613, 623: Bent portions

INDUSTRIAL APPLICABILITY

The present invention relates to a welding apparatus for manufacture of electrode assemblies, the welding apparatus including an electrode assembly configured such that a plurality of positive electrodes and a plurality of negative electrodes are stacked in the state in which separators are interposed therebetween, guides configured to reduce tensile force of electrode tabs protruding from the electrode assembly, an anvil configured to allow the electrode tabs to be disposed thereon, and a horn configured to apply ultrasonic waves to the electrode tabs disposed on the anvil, a welding method using the same, and an electrode assembly manufactured by the welding method, and therefore the present invention has industrial applicability.

The invention claimed is:

1. A welding apparatus for manufacture of electrode assemblies, the welding apparatus comprising:
   an electrode assembly configured such that a plurality of positive electrodes and a plurality of negative electrodes are alternatingly stacked with separators interposed therebetween;
   a guide configured to reduce tensile force of electrode tabs protruding from the electrode assembly, the guide including a first guide located on a first side of the electrode tabs and a second guide located on a second side of the electrode tabs;
   wherein each of the first guide and the second guide comprises a rotary portion configured to apply opposing forces to the electrode tabs, and wherein the rotary portions are aligned along an axis and apply the opposing forces along the axis;
   a first welding unit disposed on a first side of the electrode tabs; and
   a second welding unit disposed on a second side of the electrode tabs.

2. The welding apparatus according to claim 1, wherein the first welding unit is a horn configured to apply ultrasonic waves to the electrode tabs disposed on an anvil, and the second welding unit is an anvil.

3. The welding apparatus according to claim 1, wherein the first guide and the second guide are configured to be moved so as to be closer to each other or to be farther away from each other.

4. The welding apparatus according to claim 3, wherein the rotary portions of the first and second guides are formed in a roller shape or a curved portion comprising a curved surface, and a rotation axis of the rotary portion is parallel to a width of each of the electrode tabs.

5. The welding apparatus according to claim 4, wherein each of the first guide and the second guide further comprises a main body portion having the rotary portion or the curved portion coupled to one end of the main body portion.

6. The welding apparatus according to claim 5, wherein the main body portion comprises a bendable portion, and the main body portion is bent at the bendable portion or is rotatable about a rotation axis of the bendable portion.

7. The welding apparatus according to claim 4, wherein the rotary portion of the first guide and the rotary portion of the second guide are rotated in opposite directions to push the electrode tabs in a direction toward the electrode assembly.

8. The welding apparatus according to claim 7, wherein rotational force of the rotary portion is provided by repulsive force generated due to a magnetic field.

9. The welding apparatus according to claim 1, wherein welding by the first welding unit and the second welding unit is started in a state in which the electrode tabs are aligned by the guide.

10. A welding method using the welding apparatus according to claim 1, the welding method comprising:
    (a) preparing an electrode assembly;
    (b) pushing, by a guide, electrode tabs in a direction toward the electrode assembly while bringing the electrode tabs into contact with each other; and
    (c) disposing a welding region of the electrode tabs between the first welding unit and the second welding unit and welding the electrode tabs, wherein
    the guide comprises a first guide located on a first side of the electrode tabs and a second guide located on a second side of the electrode tabs.

11. The welding method according to claim 10, wherein step (b) is performed by pushing the electrode tabs in the direction toward the electrode assembly in a state in which the first guide and the second guide have been moved so as to be a first distance apart.

12. The welding method according to claim 10, wherein step (b) is performed through a process of pushing the electrode tabs in the direction toward the electrode assembly while the first guide and the second guide are being moved so as to be a first distance apart.

13. The welding method according to claim 10, wherein a rotary portion of the first guide and a rotary portion of the second guide are rotated in opposite directions in order to push the electrode tabs in the direction toward the electrode assembly.

14. The welding method according to claim 10, wherein the electrode tabs are aligned in a loosened state through step (b).

15. A welding apparatus for manufacture of electrode assemblies, the welding apparatus comprising:
    an electrode assembly configured such that a plurality of positive electrodes and a plurality of negative electrodes are alternatingly stacked with separators interposed therebetween;
    a guide configured to reduce tensile force of electrode tabs protruding from the electrode assembly, the guide including a first guide located on a first side of the electrode tabs and a second guide located on a second side of the electrode tabs, each of the first guide and the second guide comprises a rotary portion,
    wherein each of the first guide and the second guide further comprises a main body portion having the rotary portion or the curved portion coupled to one end of the main body portion, and
    wherein the main body portion comprises a bendable portion and is rotatable about a rotation axis of the bendable portion;
    a first welding unit disposed on a first side of the electrode tabs; and a second welding unit disposed on a second side of the electrode tabs.

16. A welding apparatus for manufacture of electrode assemblies, the welding apparatus comprising:
an electrode assembly configured such that a plurality of positive electrodes and a plurality of negative electrodes are alternatingly stacked with separators interposed therebetween;
a guide configured to reduce tensile force of electrode tabs protruding from the electrode assembly, the guide including a first guide located on a first side of the electrode tabs and a second guide located on a second side of the electrode tabs, each of the first guide and the second guide comprises a rotary portion,
wherein rotational force of the rotary portion is provided by repulsive force generated due to a magnetic field;
a first welding unit disposed on a first side of the electrode tabs; and
a second welding unit disposed on a second side of the electrode tabs.

17. The welding apparatus according to claim 1, wherein the plurality of positive electrodes and the plurality of negative electrodes comprise the electrode tabs protruding outwards therefrom,
each of the electrode tabs comprises a first point at which the electrode tab is connected to an electrode plate and a second point at which a welding region begins, wherein the electrode tabs are coupled at the welding region to form a bundle, and
a length from the first point to the second point of the electrode tab is greater than a shortest length between the first point and the second point.

18. The welding apparatus according to claim 17, wherein the length from the first point to the second point of the electrode tab is greater by greater than 0 mm to less than 2 mm than the shortest length between the first point and the second point or is greater than 0.0% to less than 14.3% of the shortest length between the first point and the second point.

* * * * *